United States Patent
Chen et al.

(10) Patent No.: US 12,015,138 B2
(45) Date of Patent: Jun. 18, 2024

(54) STRIP DIVERTING MECHANISM, DRYING DEVICE AND ELECTRODE PLATE MANUFACTURING APPARATUS

(71) Applicant: CONTEMPORARY AMPEREX TECHNOLOGY CO., LIMITED, Ningde (CN)

(72) Inventors: Wei Chen, Ningde (CN); Huan Che, Ningde (CN); Yuting Li, Ningde (CN); Yalong Qing, Ningde (CN); Tao Nie, Ningde (CN); Fang Luo, Ningde (CN); Shisong Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/350,680

(22) Filed: Jul. 11, 2023

(65) Prior Publication Data
US 2023/0352650 A1    Nov. 2, 2023

Related U.S. Application Data

(63) Continuation of application No. PCT/CN2022/121053, filed on Sep. 23, 2022.

(30) Foreign Application Priority Data

Feb. 28, 2022    (CN) .......................... 202210212724.7

(51) Int. Cl.
*H01M 4/04*    (2006.01)
*B05C 13/00*    (2006.01)

(52) U.S. Cl.
CPC ........... *H01M 4/0471* (2013.01); *B05C 13/00* (2013.01); *H01M 4/0404* (2013.01)

(58) Field of Classification Search
None
See application file for complete search history.

(56) References Cited

U.S. PATENT DOCUMENTS

| | | | | |
|---|---|---|---|---|
| 3,743,197 A | * | 7/1973 | Hawkins | B29C 53/32 226/7 |
| 3,764,085 A | * | 10/1973 | Hawkins | B26D 1/035 226/97.1 |
| 4,418,100 A | * | 11/1983 | Bedwell | C23C 2/29 427/398.1 |

(Continued)

FOREIGN PATENT DOCUMENTS

| | | |
|---|---|---|
| CN | 102569731 A | 7/2012 |
| CN | 104340398 A | 2/2015 |

(Continued)

*Primary Examiner* — Jethro M. Pence
(74) *Attorney, Agent, or Firm* — ANOVA LAW GROUP, PLLC

(57) ABSTRACT

A strip diverting mechanism includes a negative pressure unit and an air discharge unit. The negative pressure unit and the air discharge unit are arranged opposite each other, and a gap through which a strip passes is formed between the negative pressure unit and the air discharge unit. The negative pressure unit is configured to provide a suction force to the strip and the air discharge unit is configured to provide a repulsive force to the strip, to prevent the strip from contacting the negative pressure unit and the air discharge unit.

19 Claims, 6 Drawing Sheets

(56) References Cited

U.S. PATENT DOCUMENTS

| | | | | |
|---|---|---|---|---|
| 4,601,112 | A * | 7/1986 | Kush | B21B 45/0281 34/95 |
| 4,792,249 | A * | 12/1988 | Lahr | B65H 5/222 271/197 |
| 5,295,586 | A * | 3/1994 | Chesnutt | B65H 29/62 209/552 |
| 5,354,047 | A * | 10/1994 | Chesnutt | B65H 29/585 271/197 |
| 5,384,166 | A * | 1/1995 | Sato | F16F 15/03 427/349 |
| 5,441,252 | A * | 8/1995 | Hommes | B65H 29/62 271/299 |
| 6,148,653 | A * | 11/2000 | Sako | B21B 37/68 72/12.5 |
| 6,314,638 | B1 * | 11/2001 | Kaido | H01M 10/05 29/730 |
| 6,845,928 | B1 * | 1/2005 | Felgen | C23C 2/20 118/63 |
| 8,464,654 | B2 * | 6/2013 | Barjon | C23C 2/00344 118/400 |
| 8,844,462 | B2 * | 9/2014 | Onozawa | C23C 2/00344 118/66 |
| 8,899,176 | B2 * | 12/2014 | Sakaue | B05D 5/10 427/207.1 |
| 9,004,000 | B2 * | 4/2015 | Koga | C23C 2/004 118/62 |
| 9,021,982 | B2 * | 5/2015 | Koga | B05C 3/12 118/62 |
| 9,133,540 | B2 * | 9/2015 | Jang | C23C 2/0035 |
| 9,446,929 | B2 * | 9/2016 | Jang | C23C 2/004 |
| 9,487,853 | B2 * | 11/2016 | Jang | B05C 3/00 |
| 9,550,205 | B2 * | 1/2017 | Guastini | H01F 7/06 |
| 9,957,585 | B2 * | 5/2018 | Takahashi | C21D 9/561 |
| 9,968,958 | B2 * | 5/2018 | Guastini | H01F 7/06 |
| 10,000,309 | B2 * | 6/2018 | Carmichael | B65C 9/30 |
| 10,501,838 | B2 * | 12/2019 | Oohashi | C23C 2/20 |
| 10,815,559 | B2 * | 10/2020 | Yonekura | C23C 2/40 |
| 11,072,845 | B2 * | 7/2021 | Kurisu | C23C 2/00 |
| 11,124,863 | B2 * | 9/2021 | Kayama | C23C 2/40 |
| 11,525,177 | B2 * | 12/2022 | Kayama | B05C 3/02 |
| 2003/0129313 | A1 * | 7/2003 | Tanokuchi | C23C 2/20 427/430.1 |
| 2004/0050323 | A1 * | 3/2004 | Chae | C23C 2/14 118/100 |
| 2005/0247262 | A1 * | 11/2005 | Yoshikawa | C23C 2/20 118/123 |
| 2009/0191360 | A1 * | 7/2009 | Teramoto | C23C 2/5245 427/595 |
| 2010/0200126 | A1 * | 8/2010 | Onozawa | C23C 2/00344 118/66 |
| 2010/0224120 | A1 * | 9/2010 | Fujioka | C23C 2/20 118/63 |
| 2010/0282161 | A1 * | 11/2010 | Fujioka | C23C 2/20 118/62 |
| 2012/0094031 | A1 * | 4/2012 | Schmitt | B05C 15/00 427/372.2 |
| 2014/0295093 | A1 * | 10/2014 | Hirao | C25D 21/06 204/198 |
| 2017/0009326 | A1 * | 1/2017 | Yonekura | C23C 2/51 |
| 2017/0114437 | A1 * | 4/2017 | Yonekura | B05C 11/06 |
| 2018/0251879 | A1 * | 9/2018 | Yonekura | C23C 2/40 |
| 2018/0345310 | A1 * | 12/2018 | Watanabe | B05C 5/0208 |
| 2018/0372411 | A1 * | 12/2018 | Irie | C23C 2/004 |
| 2019/0085437 | A1 * | 3/2019 | Nishizawa | C23C 2/40 |
| 2019/0263444 | A1 * | 8/2019 | Yoshikawa | B60Q 9/00 |
| 2019/0370995 | A1 * | 12/2019 | Yonekura | G01B 11/028 |
| 2019/0390315 | A1 * | 12/2019 | Yonekura | C23C 2/52 |
| 2022/0344629 | A1 * | 10/2022 | Matsunaga | B05D 1/26 |

FOREIGN PATENT DOCUMENTS

| | | | |
|---|---|---|---|
| CN | 107398408 A | | 11/2017 |
| CN | 207655430 U | | 7/2018 |
| CN | 112441439 A | * 3/2021 | ............... B65H 1/04 |
| JP | 2004115235 A | | 4/2004 |
| JP | 2004359366 A | | 12/2004 |
| JP | 2013249154 A | | 12/2013 |
| WO | 2021090719 A1 | | 5/2021 |

* cited by examiner

STRIP DIVERTING MECHANISM, DRYING DEVICE AND ELECTRODE PLATE MANUFACTURING APPARATUS

CROSS-REFERENCE TO RELATED APPLICATIONS

The present application is a continuation of International Application No. PCT/CN2022/121053, filed on Sep. 23, 2022, which claims priority to Chinese patent application no. 202210212724.7, filed on Feb. 28, 2022 and entitled "STRIP DIVERTING MECHANISM, DRYING DEVICE AND ELECTRODE PLATE MANUFACTURING APPARATUS", which are incorporated herein by reference in their entirety.

TECHNICAL FIELD

The present application relates to the technical field of battery production, and in particular to a strip diverting mechanism, a drying device and an electrode plate manufacturing apparatus.

BACKGROUND ART

Achieving energy conservation and emission reduction is the key to the sustainable development of the automotive industry. Electric vehicles have become an important part of the sustainable development of the automotive industry due to their advantages in energy conservation and being environmentally friendly. For the electric vehicles, the battery technology is an important factor to their development.

During manufacturing batteries, the production efficiency of the batteries is a non-negligible issue. Therefore, how to increase the production efficiency of the batteries is an urgent technical problem to be solved in the battery technology.

SUMMARY

The present application provides a strip diverting mechanism, a drying device and an electrode plate manufacturing apparatus, which can increase the production efficiency of batteries.

The present application is achieved by the following technical solutions.

In a first aspect, the present application provides a diverting mechanism for changing a running direction of a strip, the strip diverting mechanism comprising a negative pressure unit and an air discharge unit, wherein the negative pressure unit and the air discharge unit are arranged opposite each other, and a gap through which the strip passes is formed between the negative pressure unit and the air discharge unit; and the negative pressure unit is configured to provide a suction force to the strip, and the air discharge unit is configured to provide a repulsive force to the strip such that the strip is not in contact with the negative pressure unit and the air discharge unit.

In the technical solution of the embodiment of the present application, compared with a solution in which a strip is attached to a peripheral surface of a diverting roller to divert the running direction, this solution utilizes the suction force provided by the negative pressure unit and the repulsive force provided by the air discharge unit to divert the running direction of the strip without contacting the negative pressure unit and the air discharge unit, so that the strip can be prevented from being wrinkled due to a roller adherence phenomenon, avoiding the scrapping of the strip, improving the yield of the strip, and thereby increasing the production efficiency of batteries.

In some embodiments, the air discharge unit comprises an air discharge surface arranged facing the negative pressure unit and provided with a plurality of air discharge holes.

In the technical solution of the embodiment of the present application, an airflow is ejected to the strip through the plurality of air discharge holes to ensure that the strip is subjected to a stable and effective repulsive force, so that the running direction of the strip is diverted without contacting the air discharge unit.

In some embodiments, the air discharge surface is an arc-shaped surface.

In the technical solution of the embodiment of the present application, in order to prevent the strip from being wrinkled, the strip is diverted smoothly in an arc-shaped trajectory, and the diverted portion of the strip is arc-shaped accordingly. To this end, the air discharge surface is configured as an arc-shaped surface, the plurality of air discharge holes provided in the air discharge surface are also correspondingly arranged, and the airflow ejected therefrom acts on the corresponding position of the strip, so that the posture of the strip deformed by the repulsive force corresponds to the running trajectory, thereby ensuring that the strip is diverted smoothly without contact.

In some embodiments, the air discharge surface is a semi-cylindrical surface.

In the technical solution of the embodiment of the present application, the air discharge surface is configured as a semi-cylindrical surface, so that the posture of the strip deformed by the repulsive force is also semicircular, that is, the strip is diverted by an angle of one hundred and eighty degrees.

In some embodiments, the air discharge unit further comprises an air intake hole and is internally provided with a cavity, the air discharge holes and the air intake hole both being in communication with the cavity.

In the technical solution of the embodiment of the present application, the air discharge unit has a simple structure, and is convenient to manufacture. The airflow is collected in the cavity through the air intake hole, and then ejected through the plurality of air discharge holes to ensure an effective repulsive force provided to the strip, so that the strip is diverted without contact.

In some embodiments, an air discharge speed of the air discharge unit is 1-20 m/s.

In the technical solution of the embodiment of the present application, the larger the air discharge speed of the air discharge unit, the larger the repulsive force it provides to the strip; and the larger the repulsive force, the higher the diverting efficiency of the strip. By limiting the air discharge speed range of the air discharge unit, that is, limiting the range of the repulsive force of the air discharge unit to the strip, it is ensured that the repulsive force can realize the non-contact diverting of the strip without causing damage to the strip. For example, when the air discharge speed of the air discharge unit is 1 m/s, the strip can realize non-contact diverting; and when the air discharge speed of the air discharge unit is 20 m/s, the strip can perform non-contact diverting with a high efficiency, and the repulsive force received will not cause damage to the strip.

In some embodiments, the negative pressure unit comprises a body, a first air discharge portion and a second air discharge portion, wherein the body is internally provided with a chamber, and the first air discharge portion and the second air discharge portion are connected to the body and in communication with the chamber; and the first air discharge portion and the second air discharge portion are arranged at intervals, so as to form a negative pressure between the first air discharge portion and the second air discharge portion to provide the suction force to the strip.

In the technical solution of the embodiment of the present application, the first air discharge portion and the second air discharge portion eject the air from the chamber of the body outwardly, which will create a Venturi phenomenon (according to Bernoulli's law, the increase of flow velocity is accompanied by the decrease of fluid pressure, i.e. Venturi phenomenon). That is, a negative pressure is formed between the first air discharge portion and the second air discharge portion, and the negative pressure acts on the strip to provide a suction force to the strip. The force pulls the strip so that the strip is diverted without contacting the negative pressure unit.

In some embodiments, an air discharge direction of the first air discharge portion is inclined to a direction away from the second air discharge portion; and an air discharge direction of the second air discharge portion is inclined to a direction away from the first air discharge portion.

In the technical solution of the embodiment of the present application, by setting the air discharge directions of the first air discharge portion and the second air discharge portion, the airflow ejected from the two is ejected to the outside and does not act on the strip, so as to prevent the high-pressure airflow from interfering with the diverting of the running direction of the strip, and also prevent the airflow from damaging the surface of the strip.

In some embodiments, the first air discharge portion and the second air discharge portion are arranged at intervals in the running direction of the strip in the gap.

In the technical solution of the embodiment of the present application, by arranging the first air discharge portion and the second air discharge portion at intervals in the running direction of the strip in the gap, the negative pressure formed between the first air discharge portion and the second air discharge portion can effectively act on the strip located in the gap, thereby ensuring the smooth non-contact diverting of the strip.

In some embodiments, an air discharge speed of the first air discharge portion and/or the second air discharge portion is 5-20 m/s.

In the technical solution of the embodiment of the present application, the larger the air discharge speed of the first air discharge portion and/or the second air discharge portion, the larger the suction force provided by the negative pressure formed between the two; and the larger the suction force, the higher the diverting efficiency of the strip. By limiting the air discharge speed range of the first air discharge portion and/or the second air discharge portion, that is, limiting the range of the suction force of the negative pressure unit to the strip, it is ensured that the suction force can realize the non-contact diverting of the strip without causing damage to the strip. For example, when the air discharge speed of the first air discharge portion and/or the second air discharge portion is 1 m/s, the strip can realize non-contact diverting; and when the air discharge speed of the first air discharge portion and/or the second air discharge portion is 20 m/s, the strip can perform non-contact diverting with a high efficiency, and the suction force received will not cause damage to the strip.

In some embodiments, the negative pressure unit further comprises a first flow guide member and a second flow guide member, wherein the first flow guide member is connected to the side of the first air discharge portion away from the second air discharge portion, so as to guide an airflow to flow in the direction away from the second air discharge portion; and the second flow guide member is connected to the side of the second air discharge portion away from the first air discharge portion, so as to guide the airflow to flow in the direction away from the first air discharge portion.

In the technical solution of the embodiment of the present application, by providing the first flow guide member, the airflow ejected from the first air discharge portion is ejected in the direction away from the second air discharge portion under the action of the first flow guide member, so as to prevent the airflow from acting on the strip and interfering with the diverting of the strip; and by providing the second flow guide member, the airflow ejected from the second air discharge portion is ejected in the direction away from the first air discharge portion under the action of the second flow guide member, so as to prevent the airflow from acting on the strip and interfering with the diverting of the strip.

In some embodiments, the first flow guide member and/or the second flow guide member has a length of 20-500 mm.

In the technical solution of the embodiment of the present application, when the length of the first flow guide member and/or the second flow guide member is 20 mm, it is possible that the airflow ejected from the first flow guide member and/or the second flow guide member flows to the outside of the negative pressure unit, avoiding interference with the strip, and ensuring that the first flow guide member and/or the second flow guide member has lower manufacturing costs, and avoiding taking up extra space due to the excessive length of the first flow guide member and/or the second flow guide member; and when the length of the first flow guide member and/or the second flow guide member is 500 mm, it is possible that the airflow ejected from the first flow guide member and/or the second flow guide member effectively flows to the outside of the negative pressure unit, avoiding interference with the running of the strip.

In some embodiments, the negative pressure unit further comprises a first protective member and a second protective member, wherein one end of the first protective member is connected to the side of the first air discharge portion close to the second air discharge portion, and the other end of the first protective member extends toward the second air discharge portion; and one end of the second protective member is connected to the side of the second air discharge portion close to the first air discharge portion, and the other end of the second protective member extends toward the first air discharge portion.

In the technical solution of the embodiment of the present application, by providing the first protective member and the second protective member, it is possible to effectively avoid the occurrence of a situation in which because of the excessive suction force, the strip is pulled to an inner wall of the body, and the friction with the inner wall of the body causes the strip to be scrapped. When the suction force provided by the negative pressure unit is too large, the strip is deformed toward the negative pressure unit and abuts against the first protective member and the second protective member, and the first protective member and the second protective member limit the further deformation of the strip, avoiding the occurrence of a situation in which the surface of the strip is damaged and scrapped.

In some embodiments, the negative pressure unit further comprises an air equalization member arranged in the chamber and separating an air inlet of the body from the first air discharge portion and the second air discharge portion.

In the technical solution of the embodiment of the present application, by providing the air equalization member, after entering the chamber through the air inlet, the airflow passes through the air equalization member and is ejected evenly from the first air discharge portion and the second air discharge portion, ensuring that the negative pressure is effectively formed to provide a stable suction force to the strip.

In a second aspect, the present application provides a drying device for drying a strip, the drying device comprising: a box; and a strip diverting mechanism according to any one of the embodiments in the first aspect, which is arranged inside the box and configured to change the running direction of the strip in the box.

In the technical solution of the embodiment of the present application, in the box, the strip can realize non-contact diverting under the action of the strip diverting mechanism, preventing the strip from being wrinkled on the surface of the strip due to a roller adherence phenomenon, so that the strip is smoothly and safely dried, thereby increasing the production efficiency of batteries.

In some embodiments, the strip diverting mechanism is configured to change the running direction of the strip from a first direction to a second direction, the first direction being opposite to the second direction; and the drying device further comprises a drying unit arranged in the box and located between a first strip segment running in the first direction and a second strip segment running in the second direction for blowing air to the first strip segment and the second strip segment.

In the technical solution of the embodiment of the present application, the strip can realize non-contact diverting under the action of the strip diverting mechanism, and the angle of diverting is one hundred and eighty degrees, so that the strip can run in a serpentine manner along the height direction in the box, improving the space utilization of the box compared with a solution in which the strip only runs in one direction in the box. By providing a drying unit between the first strip segment and the second strip segment, and enabling the drying unit to blow air to the first strip segment and the second strip segment at the same time, the drying efficiency of the strip is effectively increased and the production efficiency of batteries is increased.

In some embodiments, the drying unit is provided with an air chamber, a first air blowing surface and a second air blowing surface, wherein the first air blowing surface is arranged facing the first strip segment, the second air blowing surface is arranged facing the second strip segment, the air chamber is arranged between the first air blowing surface and the second air blowing surface, and the first air blowing surface and the second air blowing surface are each provided with an air blowing hole in communication with the air chamber.

In the technical solution of the embodiment of the present application, the drying unit has a simple structure, and is convenient to manufacture. The airflow in the air chamber can be ejected to the first strip segment and the second strip segment through the air blowing holes of the first air blowing surface and the second air blowing surface respectively, and then dry the first strip segment and the second strip segment to ensure the drying efficiency of the strip.

In a third aspect, the present application provides an electrode plate manufacturing apparatus, comprising: a coating device for coating a slurry on a surface of an electrode plate; and a drying device according to any one of the embodiments in the second aspect, wherein in a running direction of the electrode plate, the drying device is arranged downstream of the coating device for drying the slurry on the electrode plate.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

BRIEF DESCRIPTION OF THE DRAWINGS

In order to more clearly describe the technical solutions of the embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

Figure 1:
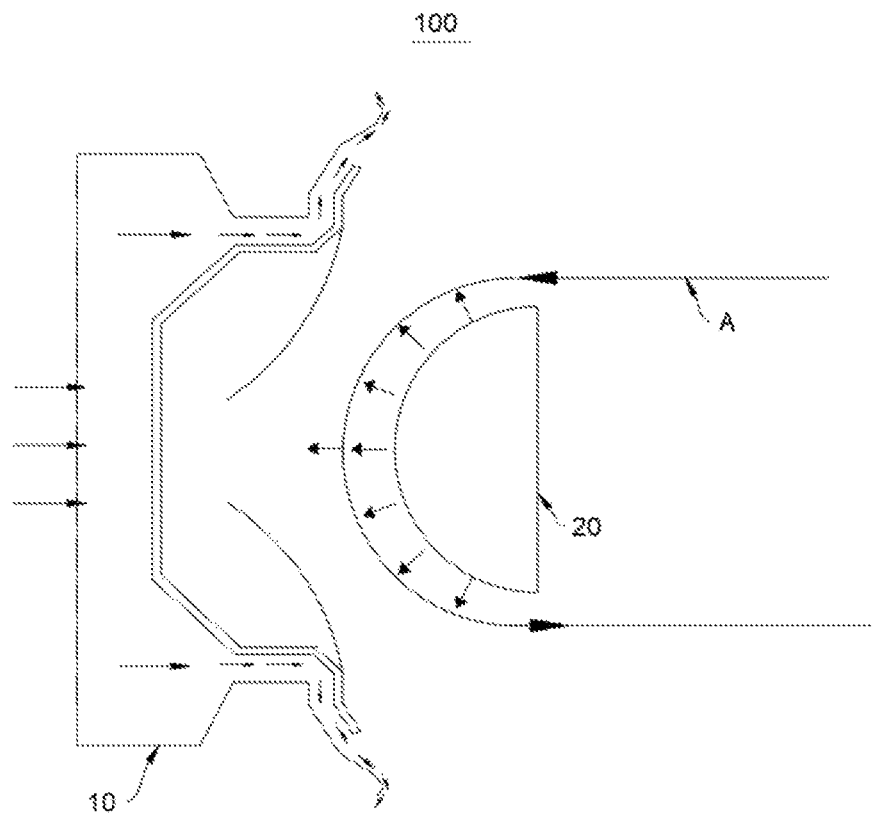
FIG. 1 is a schematic diagram of a strip diverting mechanism in some embodiments of the present application.

List of reference signs: 100—Strip diverting mechanism; 10—Negative pressure unit; 11—Body; 110—Chamber; 12—First air discharge portion; 13—Second air discharge portion; 14—First flow guide member; 15—Second flow guide member; 16—First protective member; 17—Second protective member; 18—Air equalization member; 20—Air discharge unit; 21—Air discharge surface; 22—Air discharge hole; 23—Air intake hole; 24—Cavity; 200—Drying device; 30—Box; 40—Drying unit; 41—Air chamber; 42—First air blowing surface; 43—Second air blowing surface; 44—Air blowing hole; 50—Diverting roller; 60—Running roller; 300—First strip segment; 301—Second strip segment.

DETAILED DESCRIPTION OF EMBODIMENTS

In order to make objects, technical solutions and advantages of embodiments of the present application clearer, the technical solutions in the embodiments of the present application will be clearly described below with reference to the drawings for the embodiments of the present application. Obviously, the described embodiments are some of, rather than all of, the embodiments of the present application. All the other embodiments obtained by those of ordinary skill in the art based on the embodiments of the present application without any creative effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application as well as the foregoing accompanying drawings are configured to distinguish between different objects, rather than describing a specific order or a primary-secondary relationship.

In the present application, the phrase "embodiment" mentioned means that the specific features, structures, or characteristics described with reference to the embodiments can be encompassed in at least one embodiment of the present application. The phrase at various locations in the description does not necessarily refer to the same embodiment, or an independent or alternative embodiment exclusive of another embodiment.

In the description of the present application, it should be noted that, the terms "mount", "connected", "connect", or "attach" should be interpreted in a broad sense unless explicitly defined and limited otherwise. For example, they may be a fixed connection, a detachable connection, or an integral connection; or may be a direct connection, an indirect connection by means of an intermediate medium, or internal communication between two elements. For those of ordinary skills in the art, the specific meaning of the foregoing terms in the present application may be understood according to specific circumstances.

The term "and/or" in the present application is merely a description of the associated relationship of associated objects, representing that three relationships may exist, for example, A and/or B, may be expressed as: presence of A, both A and B, or B. In addition, the character "/" in the present application generally indicates that the associated objects before and after the character are in an "or" relation.

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the accompanying drawings, as well as the dimensions, such as an overall thickness, length and width, of an integrated device are merely illustrative and should not be construed to limit the present application in any way.

"A plurality of" appearing in the present application means two or more (including two).

In the present application, a battery cell may include a lithium ion secondary battery, a lithium ion primary battery, a lithium-sulfur battery, a sodium-lithium ion battery, a sodium ion battery or a magnesium ion battery, etc., which will not be limited in the embodiments of the present application.

A battery mentioned in the embodiments of the present application refers to a single physical module comprising one or more battery cells to provide a higher voltage and capacity. For example, the battery mentioned in the present application may include a battery module, a battery pack, etc. The battery generally comprises a case for enclosing one or more battery cells. The case can prevent liquid or other foreign matters from affecting charging or discharging of a battery cell.

The core member of the battery that can implement a repeated charge and discharge function is an electrode assembly in the battery cell. The electrode assembly comprises an electrode plate and a separator, the electrode plate comprising a positive electrode plate and a negative electrode plate. The separator is usually arranged between the positive electrode plate and the negative electrode plate for insulation of the positive electrode plate from the negative electrode plate, and the separator may be made of polypropylene (PP), polyethylene (PE), etc. The battery cell operates mainly by relying on movements of metal ions between the positive electrode plate and the negative electrode plate. The electrode plate comprises a current collector and an active material layer. The current collector has a coating area coated with an active material layer and an uncoated area not coated with an active material layer in a width direction of the electrode plate. Tabs are cut on the current collector not coated with the active material layer, and the tabs realize the charge and discharge of the electrode assembly. The current collector can be metal foil, such as copper foil, aluminum foil, and the like. A process for preparation of the electrode plate comprises a coating procedure in which a stirred slurry (i.e., the active material in the form of a slurry) is evenly applied on the current collector to form a film layer, and a drying procedure in which the film layer is dried to be a dry film layer so as to form the active material layer.

At present, from the development of the market situation, electric vehicles have become an important part of the sustainable development of the automotive industry. The battery provides energy for the running of a vehicle body and the operations of various electrical components in the vehicle body. For the electric vehicles, the battery technology is an important factor to their development. In the development of battery technology, how to increase the production efficiency of batteries is an urgent technical problem to be solved in the battery technology.

The inventors have found that in the preparation process of an electrode plate, during running, the electrode plate coated with an active material will be diverted by means of a diverting roller, to realize the change of the running direction of the electrode plate; however, the electrode plate is diverted by means of a diverting roller and then diverted by means of the next diverting roller, the surface of the electrode plate that comes into contact with the next diverting roller will change. For example, the electrode plate passes through a first diverting roller and a second diverting roller in sequence, a lower surface of the electrode plate will be attached to the first diverting roller when being diverted by means of the first diverting roller, and then an upper surface of the electrode plate will be attached to the second diverting roller when being diverted by means of the second diverting roller. If the upper surface is coated with the active material, the active material will be adhered to a peripheral surface of the second diverting roller, and a roller adherence phenomenon will occur, causing the electrode plate to be wrinkled and thus to be scrapped, and in turn restricting the production efficiency of batteries.

Based on the above consideration, in order to avoid the roller adherence phenomenon during the diverting of the electrode plate, and to increase the production efficiency of batteries, the inventor, after in-depth studies, have designed a strip diverting mechanism for changing a running direction of a strip, the strip diverting mechanism comprising a negative pressure unit and an air discharge unit. The negative pressure unit and the air discharge unit are arranged opposite each other, and a gap through which the strip passes is formed between the negative pressure unit and the air discharge unit. The negative pressure unit is configured to provide a suction force to the strip, and the air discharge unit is configured to provide a repulsive force to the strip such that the strip is not in contact with the negative pressure unit and the air discharge unit.

In the technical solution of the embodiment of the present application, compared with a solution in which a strip is attached to a peripheral surface of a diverting roller to divert the running direction, this solution utilizes the suction force provided by the negative pressure unit and the repulsive force provided by the air discharge unit to change the running direction of the strip, so as to divert the running direction of the strip without contacting the negative pressure unit and the air discharge unit, so that the strip can be prevented from being wrinkled due to a roller adherence phenomenon, avoiding the scrapping of the strip, improving the yield of the strip, and thereby increasing the production efficiency of batteries.

The strip mentioned in the embodiments of the present application may refer to an electrode plate, or other materials that are strip-shaped and need to divert the running direction. An electrode plate (a current collector coated with an active material) is used as an example of the strip for illustration below.

The strip diverting mechanism disclosed in the embodiments of the present application may be used, but not limited to, in electrode plate manufacturing apparatuses or other apparatuses that need to divert the running direction.

The technical solutions described in the embodiments of the present application are applicable to drying devices, which refer to apparatuses for drying an electrode plate coated with an active material. The drying device is applicable to an electrode plate manufacturing apparatus. The electrode plate manufacturing apparatus may refer to an apparatus comprising a coating device and a drying device. The coating device is an apparatus that can evenly apply the active material to the current collector.

In some embodiments of the present application, referring to FIG. 1, FIG. 1 is a schematic diagram of a strip diverting mechanism 100 in some embodiments of the present application. A strip is shown with a reference sign A in FIG. 1. In FIG. 1, a running direction of the strip is indicated by arrows drawn on the strip in FIG. 1.

The strip diverting mechanism 100 is configured to change the running direction of the strip, and comprises a negative pressure unit 10 and an air discharge unit 20. The negative pressure unit 10 and the air discharge unit 20 are arranged opposite each other, and a gap through which the strip passes is formed between the negative pressure unit and the air discharge unit. The negative pressure unit 10 is configured to provide a suction force to the strip, and the air discharge unit 20 is configured to provide a repulsive force to the strip such that the strip is not in contact with the negative pressure unit 10 and the air discharge unit 20.

Changing the running direction of the strip refers to that under the action of the strip diverting mechanism 100, the direction in which the strip enters the gap between the negative pressure unit 10 and the air discharge unit 20 is different from the direction in which the strip exits this gap, that is, the entrance direction is different from the exit direction. The negative pressure unit 10 is a component that provides a suction force (indicated by arrows in FIG. 1) to the surface of the strip facing the negative pressure unit 10 such that the strip is deformed in the direction of the negative pressure unit 10, and the air discharge unit 20 is a component that provides a repulsive force (indicated by arrows in FIG. 1) to the surface of the strip facing the air discharge unit 20 such that the strip is deformed in a direction away from the air discharge unit 20.

Compared with a solution in which a strip is attached to a peripheral surface of a diverting roller to divert the running direction, this solution utilizes the suction force provided by the negative pressure unit 10 and the repulsive force provided by the air discharge unit 20 to divert the running direction of the strip without contacting the negative pressure unit 10 and the air discharge unit 20, so that the strip can be prevented from being wrinkled due to a roller adherence phenomenon, avoiding the scrapping of the strip, improving the yield of the strip, and thereby increasing the production efficiency of batteries.

Optionally, in actual operating conditions, the running power of the strip can be provided by a winding roller, and the winding roller may be located downstream of the strip diverting mechanism 100 (downstream refers to that the strip will pass through the strip diverting mechanism 100 before the winding roller in its running direction).

Figure 2:
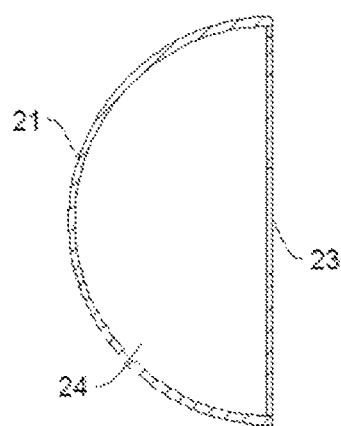
FIG. 2 is a schematic diagram of an air discharge unit in some embodiments of the present application.
Figure 3:
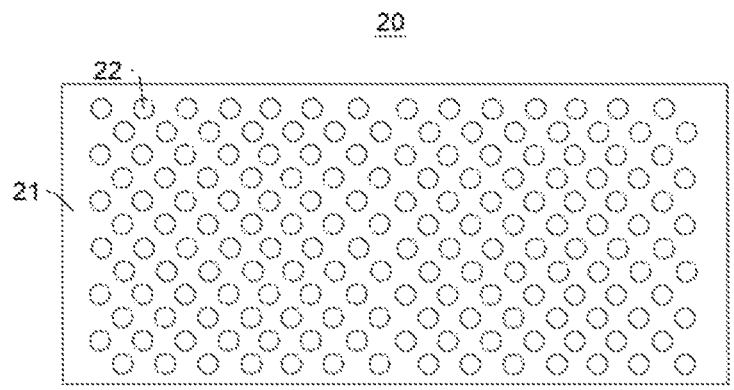
FIG. 3 is a schematic diagram of an air discharge surface in some embodiments of the present application.

In some embodiments of the present application, referring to FIGS. 2 and 3, FIG. 2 is a schematic diagram of an air discharge unit 20 in some embodiments of the present application, and FIG. 3 is a schematic diagram of an air discharge surface 21 in some embodiments of the present application. The air discharge unit 20 comprises an air discharge surface 21. The air discharge surface 21 is arranged facing the negative pressure unit 10, and the air discharge surface 21 is provided with a plurality of air discharge holes 22.

The air discharge surface 21 is a component arranged facing the negative pressure unit 10, and is also a component facing the strip in the gap. The air discharge holes 22 in the air discharge surface 21 can eject an airflow, which acts on the surface of the strip facing the air discharge surface 21 in the gap, to provide a repulsive force to the strip.

The airflow is ejected to the strip through the plurality of air discharge holes 22 to ensure that the strip is subjected to a stable and effective repulsive force, so that the running direction of the strip is diverted without contacting the air discharge unit 20.

Optionally, the air discharge surface 21 may be plate-shaped, and the air discharge surface 21 is provided with a plurality of through holes, which are air discharge holes 22. The air discharge hole 22 may be in the shape of a round hole, a rectangle, a triangle, etc.

Optionally, in this embodiment, the number of air discharge holes 22 is not limited, which may be 2, 3, 4, 5, etc. Optionally, in some other embodiments, there may be one air discharge hole 22.

In some embodiments of the present application, referring to FIGS. 1 and 2, the air discharge surface 21 is an arc-shaped surface.

The air discharge surface 21 being an arc-shaped surface means that the cross-sectional shape of the air discharge portion of the air discharge unit 20 is arc-shaped, to correspond to the shape of the strip when being diverted. The air discharge surface 21 is arc-shaped, the positions of the plurality of air discharge holes 22 on the air discharge surface 21 are also arc-shaped correspondingly, and the airflow ejected from all the air discharge holes 22 will correspondingly form an arc-shaped airflow layer and then act on the strip, causing the strip to deform in an arc shape.

In the technical solution of the embodiment of the present application, in order to prevent the strip from being wrinkled, the strip is diverted smoothly in an arc-shaped trajectory, and the diverted portion of the strip is arc-shaped accordingly. To this end, the air discharge surface 21 is configured as an arc-shaped surface, the plurality of air discharge holes 22 provided in the air discharge surface 21 are also correspondingly arranged, and the airflow ejected therefrom acts on the corresponding position of the strip, so that the posture of the strip deformed by the repulsive force corresponds to the running trajectory, thereby ensuring that the strip is diverted smoothly without contact.

Optionally, in some other embodiments, the shape of the air discharge surface 21 is not limited, and the air discharge speed of the air discharge holes 22 at different positions on the air discharge surface 21 may be controlled to provide different repulsive forces to the strips, which can also achieve safe diverting by causing the strip to deform in an arc shape.

In some embodiments of the present application, referring to FIGS. 1 and 2, the air discharge surface 21 is a semi-cylindrical surface.

The semi-cylindrical surface means that a central angle of an arc-shaped pattern corresponding to the air discharge surface 21 is one hundred and eighty degrees.

The air discharge surface 21 is configured as a semi-cylindrical surface, the position where the strip is subjected to the maximum repulsive force corresponds to the center of the air discharge surface 21, and the repulsive force at two sides of the air discharge surface 21 is the smallest, so that the posture of the strip deformed by the repulsive force is also semicircular, that is, the strip is diverted by an angle of one hundred and eighty degrees.

Optionally, in some other embodiments, by changing the central angle of the corresponding arc-shaped pattern of the air discharge surface 21, the strip can be diverted by different angles. For example, when the central angle of the corresponding arc-shaped pattern of the air discharge surface 21 is forty five degrees, the strip is diverted by forty five degrees.

In some embodiments of the present application, referring to FIG. 2, the air discharge unit 20 further comprises an air intake hole 23, the air discharge unit 20 is internally provided with a cavity 24, and the air discharge holes 22 and the air intake hole 23 are both in communication with the cavity 24.

The air intake hole 23 is a component in communication with the cavity 24 inside the air discharge unit 20, and the external airflow can enter the cavity 24 through the air intake hole 23, and then can be ejected from the air discharge holes 22. The cavity 24 is a structure formed inside the air discharge unit 20, which can collect the external airflow and eject the airflow through the air discharge holes 22. In some embodiments, the air intake hole 23 is located on the side opposite to the air discharge surface 21 (as shown in FIG. 2, the orientation of the air intake hole is illustratively indicated by the reference sign "23" in FIG. 2). In some other embodiments, the position of the air intake hole 23 is not limited, which may be at any position of the air discharge unit 20, as long as the airflow can be introduced into the cavity 24.

In the technical solution of the embodiment of the present application, the air discharge unit 20 has a simple structure, and is convenient to manufacture. The airflow is collected in the cavity 24 through the air intake hole 23, and then ejected through the plurality of air discharge holes 22 to ensure an effective repulsive force provided to the strip, and ensure the non-contact diverting of the strip.

Optionally, an air equalization structure may be provided in the cavity 24, so that the airflow in the cavity 24 is evenly ejected from each air discharge hole 22 after passing through an air equalization structure. The air equalization structure may be a component for equalizing the airflow. For example, the air equalization structure is an air equalization plate, and the air equalization plate is provided with a plurality of through holes of the same size for allowing the airflow to flow through.

In some embodiments of the present application, an air discharge speed of the air discharge unit 20 is 1-20 m/s.

The larger the air discharge speed of the air discharge unit 20, the larger the repulsive force it provides to the strip; and the larger the repulsive force, the higher the diverting efficiency of the strip. By limiting the air discharge speed range of the air discharge unit 20, that is, limiting the range of the repulsive force of the air discharge unit 20 to the strip, it is ensured that the repulsive force can realize the non-contact diverting of the strip without causing damage to the strip. For example, when the air discharge speed of the air discharge unit 20 is 1 m/s, the strip can realize non-contact diverting; and when the air discharge speed of the air discharge unit 20 is 20 m/s, the strip has a high efficiency of non-contact diverting, and the repulsive force received will not cause damage to the strip.

Optionally, in some other embodiments, the air discharge speed of the air discharge unit 20 is not limited, and its air discharge speed may be less than 1 m/s, or may be greater than 20 m/s.

Figure 4:
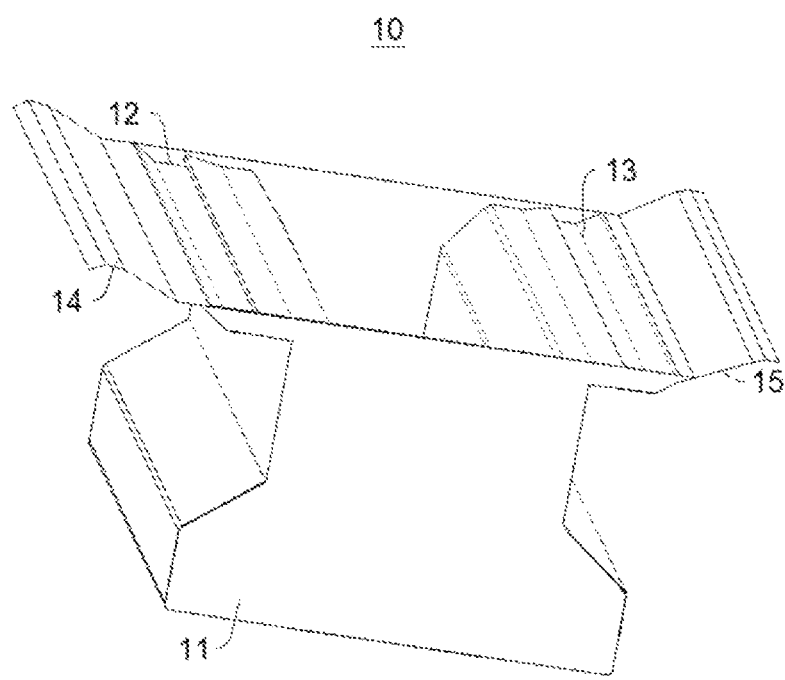
FIG. 4 is a perspective view of a negative pressure unit in some embodiments of the present application.
Figure 5:
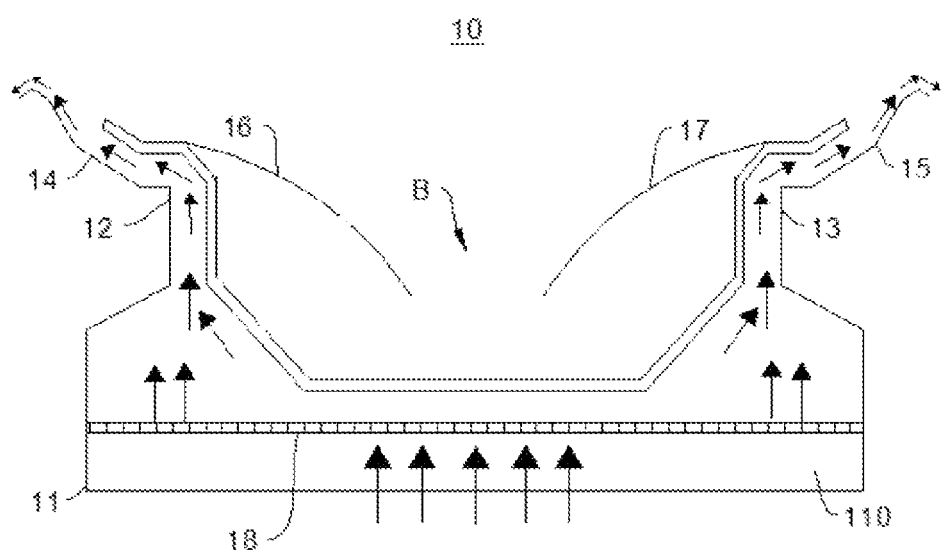
FIG. 5 is a schematic diagram of a negative pressure unit in some embodiments of the present application.

In some embodiments of the present application, referring to FIGS. 4 and 5, FIG. 4 is a perspective view of a negative pressure unit 10 in some embodiments of the present application, and FIG. 5 is a schematic diagram of a negative pressure unit 10 in some embodiments of the present application. The negative pressure unit 10 comprises a body 11, a first air discharge portion 12 and a second air discharge portion 13. The body 11 is internally provided with a chamber 110, and the first air discharge portion 12 and the second air discharge portion 13 are connected to the body 11 and in communication with the chamber 110. The first air discharge portion 12 and the second air discharge portion 13 are arranged at intervals, so as to form a negative pressure between the first air discharge portion 12 and the second air discharge portion 13 to provide the suction force to the strip.

The body 11 is a component that is connected to the first air discharge portion 12 and the second air discharge portion 13 and internally provided with a chamber 110. The first air discharge portion 12 and the second air discharge portion 13 are components that are connected to the body 11 and in communication with the chamber 110, and are configured to guide the airflow out from the chamber 110 and eject the airflow to the outside. In FIG. 5, the arrows show the flow directions of the airflows ejected from the first air discharge portion 12 and the second air discharge portion 13, and the reference sign B shows the position where the negative pressure is formed.

In the technical solution of the embodiment of the present application, the first air discharge portion 12 and the second air discharge portion 13 eject the air from the chamber 110 of the body 11 outwardly, which will create a Venturi phenomenon (according to Bernoulli's law, the increase of flow velocity is accompanied by the decrease of fluid pressure, i.e. Venturi phenomenon). That is, a negative pressure is formed between the first air discharge portion 12 and the second air discharge portion 13, and the negative pressure acts on the strip to provide a suction force to the strip. The force pulls the strip so that the strip is diverted without contacting the negative pressure unit 10.

Optionally, in some embodiments, the negative pressure unit 10 may be a Venturi nozzle that can provide a suction force. In some other embodiments, the negative pressure unit 10 may be a suction nozzle that can provide a suction force.

Optionally, the air discharge cross-sections of the first air discharge portion 12 and the second air discharge portion 13 may be circular, triangular, rectangular, etc. When the air discharge cross-sections of the first air discharge portion 12 and the second air discharge portion 13 are rectangular, they have a good air discharge consistency, which can match the shape of the electrode plate.

In some embodiments of the present application, referring to FIG. 5, an air discharge direction of the first air discharge portion 12 is inclined to a direction away from the second air discharge portion 13; and an air discharge direction of the second air discharge portion 13 is inclined to a direction away from the first air discharge portion 12.

Referring to FIG. 1, it can be seen from FIG. 1 that the position where the negative pressure is formed corresponds to the portion of the strip that is located in the gap. The air discharge direction of the first air discharge portion 12 being inclined to the direction away from the second air discharge portion 13 means that the air discharge direction of the first air discharge portion 12 will avoid the portion of the strip that is located in the gap. The air discharge direction of the second air discharge portion 13 being inclined to the direction away from the first air discharge portion 12 means that the air discharge direction of the second air discharge portion 13 will avoid the portion of the strip that is located in the gap.

In the technical solution of the embodiment of the present application, by setting the air discharge directions of the first air discharge portion 12 and the second air discharge portion 13, the airflow ejected from the two is ejected to the outside and does not act on the strip, so as to prevent the ejected airflow from interfering with the diverting of the running direction of the strip, and also prevent the airflow from damaging the surface of the strip.

In some embodiments of the present application, as shown in FIGS. 1 and 5, the first air discharge portion 12 and the second air discharge portion 13 are arranged at intervals in the running direction of the strip in the gap.

By "the first air discharge portion 12 and the second air discharge portion 13 are arranged at intervals in the running direction of the strip in the gap" means that the first air discharge portion 12 and the second air discharge portion 13 are on two sides of the portion of the strip that is located in the gap, so that the negative pressure formed between the first air discharge portion 12 and the second air discharge portion 13 corresponds to the portion of the strip that is located in the gap.

By arranging the first air discharge portion 12 and the second air discharge portion 13 at intervals in the running direction of the strip in the gap, the negative pressure formed between the first air discharge portion 12 and the second air discharge portion 13 can effectively act on the strip located in the gap, thereby ensuring the smooth non-contact diverting of the strip.

In some embodiments of the present application, an air discharge speed of the first air discharge portion 12 and/or the second air discharge portion 13 is 5-20 m/s.

By "an air discharge speed of the first air discharge portion 12 and/or the second air discharge portion 13 is 5-20 m/s" means that in some embodiments of the present application, the value range of the air discharge speed of the first air discharge portion 12 may be 5-20 m/s. The value range of the air discharge speed of the second air discharge portion 13 may be 5-20 m/s.

In the technical solution of the embodiment of the present application, the larger the air discharge speed of the first air discharge portion 12 and/or the second air discharge portion 13, the larger the suction force provided by the negative pressure formed between the two; and the larger the suction force, the higher the diverting efficiency of the strip. By limiting the air discharge speed range of the first air discharge portion 12 and/or the second air discharge portion 13, that is, limiting the range of the suction force of the negative pressure unit 10 to the strip, it is ensured that the suction force can realize the non-contact diverting of the strip without causing damage to the strip. For example, when the air discharge speed of the first air discharge portion 12 and/or the second air discharge portion 13 is 1 m/s, the strip can realize non-contact diverting; and when the air discharge speed of the first air discharge portion 12 and/or the second air discharge portion 13 is 20 m/s, the strip can perform non-contact diverting with a high efficiency, and the suction force received will not cause damage to the strip.

Optionally, in some other embodiments, the air discharge speed of the first air discharge portion 12 and/or the second air discharge portion 13 may be less than 5 m/s, or greater than 20 m/s. Optionally, in some embodiments, the air discharge speed of the first air discharge portion 12 and/or the second air discharge portion 13 should match the air discharge speed of the air discharge unit 20, so that the strip is diverted in a stable state.

In some embodiments of the present application, referring to FIG. 5, the negative pressure unit 10 further comprises a first flow guide member 14 and the second flow guide member 15. The first flow guide member 14 is connected to the side of the first air discharge portion 12 away from the second air discharge portion 13, so as to guide the airflow to flow in the direction away from the second air discharge portion 13; and the second flow guide member 15 is connected to the side of the second air discharge portion 13 away from the first air discharge portion 12, so as to guide the airflow to flow in the direction away from the first air discharge portion 12.

In FIG. 5, the arrows indicate the flow direction of the airflow. The first flow guide member 14 is a component connected to the side of the first air discharge portion 12 away from the second air discharge portion 13, and through the Coanda effect, the first flow guide member guides the airflow ejected from the first air discharge portion 12 to flow out in its extending direction, so that the airflow is ejected in the direction away from the second air discharge portion 13, that is, in a direction away from the strip. The second flow guide member 15 is a component connected to the side of the second air discharge portion 13 away from the first air discharge portion 12, and through the Coanda effect, the second flow guide member guides the airflow ejected from the second air discharge portion 13 to flow out in its extending direction, so that the airflow is ejected in the direction away from the first air discharge portion 12, that is, in the direction away from the strip.

Optionally, the first flow guide member 14 is a multi-bending structure, and the first flow guide member 14 extends in the direction away from the second air discharge portion 13 through multiple numbers of bending, and guides the airflow ejected from the first air discharge portion 12 to flow in the direction away from the second air discharge portion 13. The second flow guide member 15 is a multi-bending structure, and the second flow guide member 15 extends in the direction away from the second air discharge portion 13 through multiple numbers of bending, and guides the airflow ejected from the second air discharge portion 13 to flow in the direction away from the first air discharge portion 12. Optionally, the first flow guide member 14 may also be an arc-shaped structure, so that the airflow ejected from the first air discharge portion 12 smoothly flows along the first flow guide member 14 in the direction away from the second air discharge portion 13. The second flow guide member 15 may also be an arc-shaped structure, so that the airflow ejected from the second air discharge portion 13 smoothly flows along the second flow guide member 15 in the direction away from the first air discharge portion 12.

In the technical solution of the embodiment of the present application, by providing the first flow guide member 14, the airflow ejected from the first air discharge portion 12 is ejected in the direction away from the second air discharge portion 13 under the action of the first flow guide member 14, so as to prevent the airflow from acting on the strip and interfering with the diverting of the strip; and by providing the second flow guide member 15, the airflow ejected from the second air discharge portion 13 is ejected in the direction away from the first air discharge portion 12 under the action of the second flow guide member 15, so as to prevent the airflow from acting on the strip and interfering with the diverting of the strip.

In some embodiments of the present application, the first flow guide member 14 and/or the second flow guide member 15 has a length of 20-500 mm.

In the technical solution of the embodiment of the present application, when the length of the first flow guide member 14 and/or the second flow guide member 15 is 20 mm, it is possible that the airflow ejected from the first flow guide member 14 and/or the second flow guide member 15 flows to the outside of the negative pressure unit 10, avoiding interference with the strip, and ensuring that the first flow guide member 14 and/or the second flow guide member 15 has lower manufacturing costs, and avoiding taking up extra space due to the excessive length of the first flow guide member 14 and/or the second flow guide member 15; and when the length of the first flow guide member 14 and/or the second flow guide member 15 is 500 mm, it is possible that the airflow ejected from the first flow guide member 14 and/or the second flow guide member 15 effectively flows to the outside of the negative pressure unit 10, avoiding interference with the running of the strip.

Optionally, in some other embodiments, the length of the first flow guide member 14 and/or the second flow guide member 15 is not limited, and the length of the first flow guide member 14 and/or the second flow guide member 15 may be less than 20 mm or greater than 500 mm, as long as the suction force provided by the negative pressure unit 10 to the strip is not interfered with.

In some embodiments of the present application, as shown in FIG. 5, the negative pressure unit 10 further comprises a first protective member 16 and a second protective member 17. One end of the first protective member 16 is connected to the side of the first air discharge portion 12 close to the second air discharge portion 13, and the other end of the first protective member 16 extends toward the second air discharge portion 13; and one end of the second protective member 17 is connected to the side of the second air discharge portion 13 close to the first air discharge portion 12, and the other end of the second protective member 17 extends toward the first air discharge portion 12.

The first protective member 16 is a component that is connected to the first air discharge portion 12 and extends in a direction toward the middle between the first air discharge portion 12 and the second air discharge portion 13, and is configured to limit the amount of deformation of the strip due to the suction force. The second protective member 17 is a component that is connected to the second air discharge portion 13 and extends in a direction toward the middle between the first air discharge portion 12 and the second air discharge portion 13, and is configured to limit the amount of deformation of the strip due to the suction force. In order to ensure that an effective negative pressure is formed between the first air discharge portion 12 and the second air discharge portion 13, there is a gap between the first protective member 16 and the second protective member 17. Optionally, the first protective member 16 and the second protective member 17 are both arc-shaped, so as to adapt to the posture of the strip when being diverted.

In the technical solution of the embodiment of the present application, by providing the first protective member 16 and the second protective member 17, it is possible to effectively avoid the occurrence of a situation in which because of the excessive suction force, the strip is pulled to an inner wall of the body 11, and the friction with the inner wall of the body 11 causes the strip to be scrapped. When the suction force provided by the negative pressure unit 10 is too large, the strip is deformed toward the negative pressure unit 10 and abuts against the first protective member 16 and the second protective member 17, and the first protective member 16 and the second protective member 17 limit the further deformation of the strip, avoiding the occurrence of a situation in which the surface of the strip is damaged and scrapped.

In some embodiments of the present application, as shown in FIG. 5, the negative pressure unit 10 further comprises an air equalization member 18. The air equalization member 18 is arranged in the chamber 110 and separates an air inlet of the body 11 from the first air discharge portion 12 and the second air discharge portion 13.

The air equalization member 18 is a component that can evenly distribute the airflow. For example, the air equalization member 18 is an air equalization plate provided with a plurality of air equalization holes of the same size.

By providing the air equalization member 18, after entering the chamber 110 through the air inlet, the airflow passes through the air equalization member 18 and is ejected evenly from the first air discharge portion 12 and the second air discharge portion 13, ensuring that the negative pressure is effectively formed to provide a stable suction force to the strip.

Figure 6:
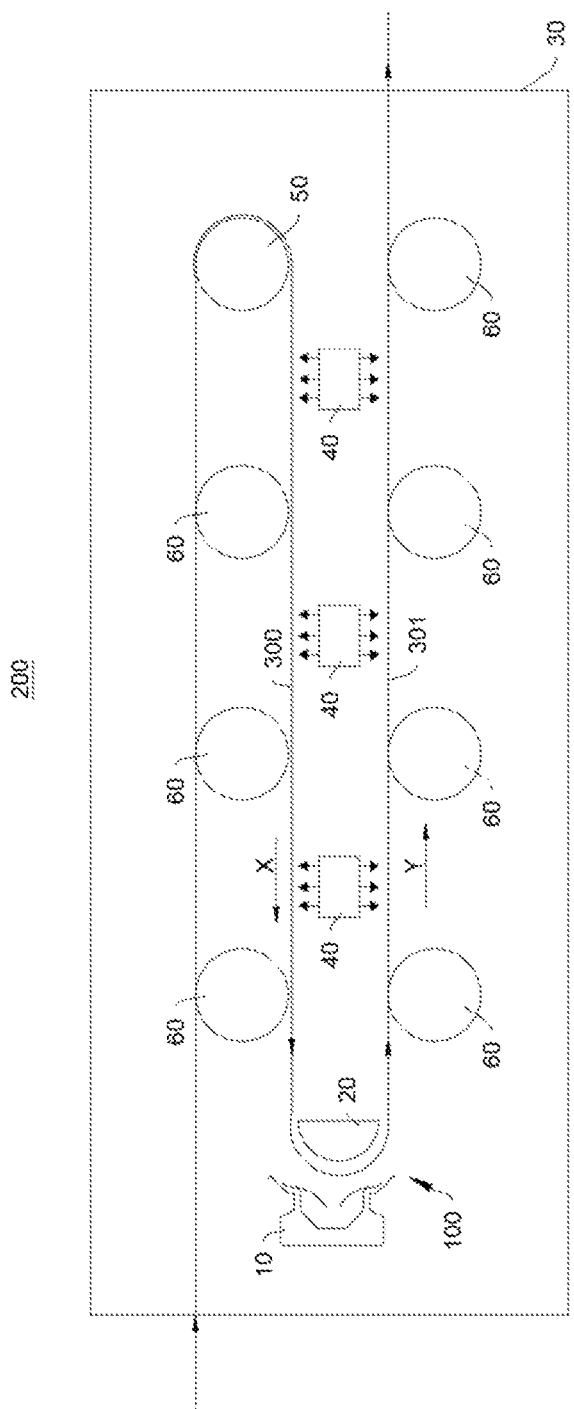
FIG. 6 is a schematic diagram of a drying device in some embodiments of the present application.

In some embodiments of the present application, further provided is a drying device 200. Referring to FIG. 6, FIG. 6 is a schematic diagram of a drying device 200 in some embodiments of the present application. The drying device 200 is configured to dry a strip, and comprises a box 30 and the strip diverting mechanism 100 as described above. The strip diverting mechanism 100 is arranged inside the box 30 and is configured to change the running direction of the strip in the box 30.

The box 30 is a component internally provided with the strip diverting mechanism 100, and the strip can be dried in the box 30 to realize a drying effect.

Referring to FIG. 6, a diverting roller 50 and a plurality of running rollers 60 are illustratively drawn in the box 30. The running rollers 60 are used for supporting the strip. The strip moves to the diverting roller 50 through a row of running rollers 60 at an upper layer, is diverted once by the diverting roller 50, then passes through the strip diverting mechanism 100, and then runs away from the box 30 after passing through a row of running rollers 60 at a lower layer. The surface of the strip that is in contact with the row of running rollers 60 at the upper layer is a lower surface, and the opposite surface is an upper surface which may be coated with an active material. It can be clearly seen from FIG. 6 that the upper surface of the strip will not come into contact with the diverting roller 50, the negative pressure unit 10, the air discharge unit 20 and any one of the running rollers 60, so that the roller adherence phenomenon will not occur.

In the box 30, the strip can realize non-contact diverting under the action of the strip diverting mechanism 100, preventing the strip from being wrinkled on the surface of the strip due to a roller adherence phenomenon, so that the strip is smoothly and safely dried, thereby increasing the production efficiency of batteries.

In some embodiments of the present application, as shown in FIG. 6, the strip diverting mechanism 100 is configured to change the running direction of the strip from a first direction to a second direction, the first direction being opposite to the second direction; and the drying device 200 further comprises a drying unit 40 arranged in the box 30 and located between a first strip segment 300 running in the first direction and a second strip segment 301 running in the second direction for blowing air to the first strip segment 300 and the second strip segment 301.

In the figures, the first direction is represented by a combination of an arrow and a reference sign "X", and the second direction is represented by a combination of an arrow and a reference sign "Y".

As shown in FIG. 6, the strip first enters the box 30 in the second direction, then moves to the diverting roller 50 through the running rollers 60, is then diverted to the first direction, then enters the strip diverting mechanism 100, is diverted to the second direction by the strip diverting mechanism 100, and exits the box 30 in the second direction after passing through the running rollers 60.

The first direction and the second direction are two opposite directions. That is, through the action of the strip diverting mechanism 100, the strip can be diverted by an angle of one hundred and eighty degrees. Through the diverting with a diverting angle of one hundred and eighty degrees, the strip can run in a serpentine manner along the height direction in the box 30, thereby effectively utilizing the height space of the box 30, improving the utilization rate of heat in the box 30, and improving the drying effect.

The first strip segment 300 is the part of the strip that is about to enter the strip diverting mechanism 100, and the second strip segment 301 is the part of the strip that has just left the strip diverting mechanism 100.

The drying unit 40 is a component for drying the strip, which is configured to supply hot air to the strip. As can be seen from the figures, the hot air blown from the drying unit 40 to the first strip segment 300 and the second strip segment 301 can act on the upper surface of the strip, i.e. on the active material.

The strip can realize non-contact diverting under the action of the strip diverting mechanism 100, and the angle of diverting is one hundred and eighty degrees, so that the strip can run in a serpentine manner along the height direction in the box 30, improving the space utilization of the box 30 compared with a solution in which the strip only runs in one direction in the box 30. By providing a drying unit 40 between the first strip segment 300 and the second strip segment 301, and enabling the drying unit 40 to blow air to the first strip segment 300 and the second strip segment 301 at the same time, the drying efficiency of the strip can be effectively increased and the production efficiency of batteries is thus increased.

Figure 7:
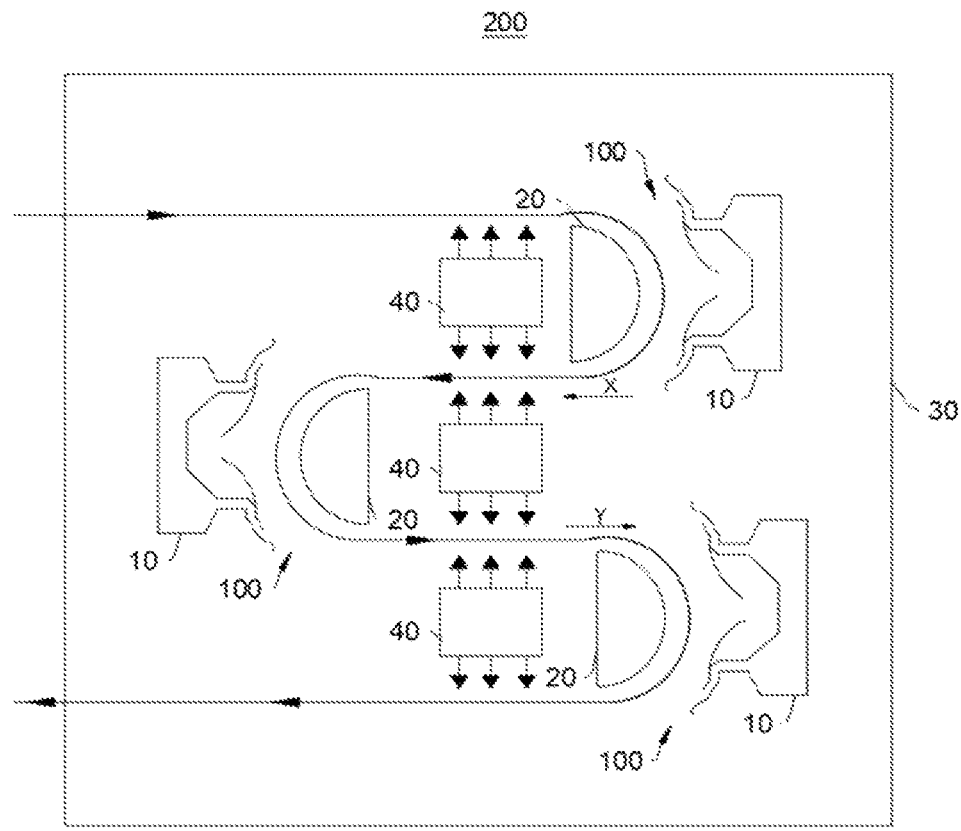
FIG. 7 is a schematic diagram of a drying device in some other embodiments of the present application.

Optionally, in some other embodiments, referring to FIG. 7, FIG. 7 is a schematic diagram of a drying device 200 in some other embodiments of the present application, the drying device 200 may comprise three strip diverting mechanisms 100 and three drying units 40. The three strip diverting mechanisms 100 and the three drying units 40 are arranged along the height direction in the box 30. The strip diverting mechanisms 100 correspond to the drying units 40 on a one-to-one basis, and the strip diverting mechanism 100 and the drying unit 40 corresponding to each other are arranged side-by-side. After entering the box 30 in the second direction, the strip is diverted to the first direction by the strip diverting mechanism 100 at the uppermost layer, then enters the strip diverting mechanism 100 in the middle and is diverted to the second direction by this strip diverting mechanism 100, finally enters the strip diverting mechanism 100 at the lowest layer and is diverted to the first direction by this strip diverting mechanism 100, and exits the box 30. The upper and lower surfaces of the strip are dried by the corresponding drying units 40.

Figure 8:
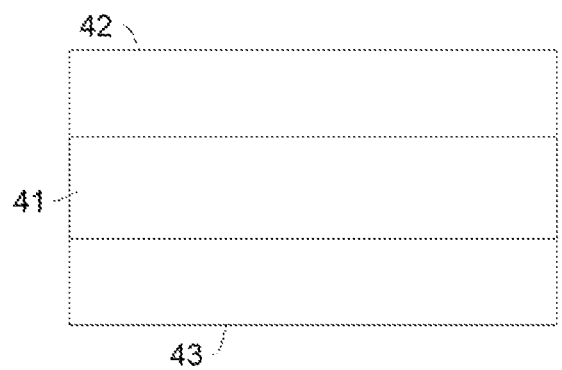
FIG. 8 is a schematic diagram of a drying unit in some embodiments of the present application.
Figure 9:
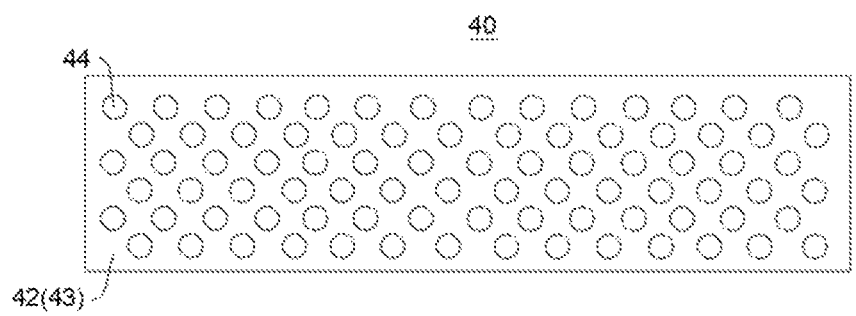
FIG. 9 is a schematic diagram of an air blowing surface of a drying unit in some embodiments of the present application.

In some embodiments of the present application, referring to FIGS. 8 and 9, FIG. 8 is a schematic diagram of a drying unit 40 in some embodiments of the present application, and FIG. 9 is a schematic diagram of an air blowing surface of a drying unit 40 in some embodiments of the present application. The drying unit 40 is provided with an air chamber 41, a first air blowing surface 42 and a second air blowing surface 43. The first air blowing surface 42 is arranged facing the first strip segment 300, the second air blowing surface 43 is arranged facing the second strip segment 301, the air chamber 41 is arranged between the first air blowing surface 42 and the second air blowing surface 43, and the first air blowing surface 42 and the second air blowing surface 43 are each provided with an air blowing hole 44 in communication with the air chamber 41.

The air chamber 41 is a structure for supplying the hot air to the first air blowing surface 42 and the second air blowing surface 43, and the hot air is ejected through the air blowing holes 44 of the first air blowing surface 42 and the second air blowing surface 43, and acts on the surface of strip.

In the technical solution of the embodiment of the present application, the drying unit 40 has a simple structure, and is convenient to manufacture. The airflow in the air chamber 41 can be ejected to the first strip segment 300 and the second strip segment 301 through the air blowing holes 44 of the first air blowing surface 42 and the second air blowing surface 43 respectively, and then dry the first strip segment 300 and the second strip segment 301 to ensure the drying efficiency of the strip.

Optionally, in some embodiments, the air chamber 41 may be provided with an air equalization structure to ensure that the hot air is evenly ejected from the air blowing holes 44 of the first air blowing surface 42 and the second air blowing surface 43. Optionally, the air blowing hole 44 may be in the shape of a round hole, a rectangle, a triangle, etc. Optionally, in some embodiments, the air blowing hole 44 has a diameter of 1 mm to 10 mm. Optionally, in some embodiments, the air discharge speed of the first air blowing surface 42 and/or the second air blowing surface 43 may be 1-20 m/s. When the air discharge speed of the first air blowing surface 42 and/or the second air blowing surface 43 is 1 m/s, the strip can be dried and it can be effectively ensured that the force of the hot air acting on the strip does not damage the surface of the strip. When the air discharge speed of the first air blowing surface 42 and/or the second air blowing surface 43 is 20 m/s, the strip can be efficiently dried and it can be ensured that the force of the hot air acting on the strip does not damage the surface of the strip.

In some embodiments of the present application, provided is an electrode plate manufacturing apparatus, comprising a coating device and a drying device 200. The coating device is configured to coat a slurry on a surface of an electrode plate, and the drying device 200 is arranged downstream of the coating device in a running direction of the electrode plate, and is configured to dry the slurry on the electrode plate.

In some embodiments of the present application, provided is a drying device 200, referring to FIGS. 1-9. The drying device 200 comprises a box 30, a diverting roller 50, a strip diverting mechanism 100, a drying unit 40 and a plurality of running rollers 60. The plurality of running rollers 60 comprises an upper-layer running roller 60 group and a lower-layer running roller 60 group. The upper-layer running roller 60 group comprises three running rollers 60, and the lower-layer running roller 60 group comprises four running rollers 60. The upper-layer running roller 60 group and the lower-layer running roller 60 are arranged at intervals along the height direction of the box 30. The diverting roller 50 is located on one side of the upper-layer running roller 60 group, and the strip diverting mechanism 100 is located on the other side and located between the upper-layer running roller 60 group and the lower-layer running roller 60 group. A plurality of drying units 40 and a plurality of strip diverting mechanisms 100 are arranged side-by-side. The strip moves in the second direction to the diverting roller 50 through the upper-layer running roller 60 group, is diverted to the first direction by the diverting roller 50, is then diverted to the second direction by the strip diverting mechanism 100 without contact, and then exits the box 30 through the lower-layer running roller 60 group.

The strip diverting mechanism 100 comprises a negative pressure unit 10 and an air discharge unit 20. The negative pressure unit 10 and the air discharge unit 20 are arranged opposite each other, and a gap through which the strip passes is formed between the negative pressure unit and the air discharge unit. When the strip passes through this gap, contactless diverting is realized by a suction force provided by the negative pressure unit 10 and a repulsive force provided by the air discharge unit 20. The air discharge unit 20 comprises an air discharge surface 21 and an air intake hole 23. The air discharge surface 21 is a semi-cylindrical surface provided with a plurality of air discharge holes 22, and a cavity 24 inside the air discharge unit 20 is in communication with the air discharge holes 22 and the air intake hole 23, and an airflow is ejected from the air discharge holes 22, so as to provide the repulsive force to the strip. An air discharge speed of the air discharge unit 20 is 1-20 m/s. The negative pressure unit 10 comprises a body 11, a first air discharge portion 12, a second air discharge portion 13, a first flow guide member 14, a second flow guide member 15, a first protective member 16, a second protective member 17 and an air equalization member 18. The body 11 is internally provided with a chamber 110, and the first air discharge portion 12 and the second air discharge portion 13 are connected to the body 11 and in communication with the chamber 110. The first flow guide member 14 is connected to the side of the first air discharge portion 12 away from the second air discharge portion 13, so as to guide the airflow to flow in the direction away from the second air discharge portion 13; and the second flow guide member 15 is connected to the side of the second air discharge portion 13 away from the first air discharge portion 12, so as to guide the airflow to flow in the direction away from the first air discharge portion 12. The first air discharge portion 12 and the second air discharge portion 13 eject the airflow to the outside, so that a negative pressure is formed between the first air discharge portion 12 and the second air discharge portion 13 to provide the suction force to the strip. One end of the first protective member 16 is connected to the side of the first air discharge portion 12 close to the second air discharge portion 13, and the other end of the first protective member 16 extends toward the second air discharge portion 13. One end of the second protective member 17 is connected to the side of the second air discharge portion 13 close to the first air discharge portion 12, and the other end of the second protective member 17 extends toward the first air discharge portion 12. The first protective member 16 and the second protective member 17 can limit the amount of deformation of the strip due to the suction force, preventing the damage to the strip due to excessive deformation, and avoiding the occurrence of a situation in which the strip is suctioned to the inner wall of the body 11 and is damaged. The air equalization member 18 is arranged in the chamber 110 so that the airflow is evenly ejected from the first air discharge portion 12 and the second air discharge portion 13.

The drying unit 40 is provided with an air chamber 41, a first air blowing surface 42 and a second air blowing surface 43. The air chamber 41 is arranged between the first air blowing surface 42 and the second air blowing surface 43, and the first air blowing surface 42 and the second air blowing surface 43 are each provided with an air blowing hole 44 in communication with the air chamber 41. The drying unit 40 blows hot air upwardly through the first air blowing surface 42, and blows hot air downwardly through the second air blowing surface 43, so as to realize multi-directional blowing and increase the drying efficiency of the drying device 200.

The foregoing descriptions are merely some embodiments of the present application, but are not intended to limit the present application. For those skilled in the art, the present application may have various modifications and variations. Any modifications, equivalent substitutions, improvements, and the like made within the spirit and principle of the present application should fall within the scope of protection of the present application.

What is claimed is:

1. A strip diverting mechanism, comprising:
   a negative pressure unit; and
   an air discharge unit;
   wherein:
   the negative pressure unit and the air discharge unit are arranged opposite each other, a gap through which a strip passes is formed between the negative pressure unit and the air discharge unit, and the negative pressure unit and the air discharge unit are configured such that a direction in which the strip enters the gap differs from a direction in which the strip exits the gap; and
   the negative pressure unit is configured to provide a suction force to the strip and the air discharge unit is configured to provide a repulsive force to the strip, to prevent the strip from contacting the negative pressure unit and the air discharge unit.

2. The strip diverting mechanism according to claim 1, wherein:
   the air discharge unit comprises an air discharge surface arranged facing the negative pressure unit and provided with a plurality of air discharge holes.

3. The strip diverting mechanism according to claim 2, wherein:
the air discharge surface is an arc-shaped surface.

4. The strip diverting mechanism according to claim 3, wherein:
the air discharge surface is a semi-cylindrical surface.

5. The strip diverting mechanism according to claim 2, wherein:
the air discharge unit further comprises an air intake hole and is internally provided with a cavity, the air discharge holes and the air intake hole being in communication with the cavity.

6. The strip diverting mechanism according to claim 1, wherein:
an air discharge speed of the air discharge unit is 1-20 m/s.

7. The strip diverting mechanism according to claim 1, wherein:
the negative pressure unit comprises a body, a first air discharge portion, and a second air discharge portion, wherein the body is internally provided with a chamber, and the first air discharge portion and the second air discharge portion are connected to the body and in communication with the chamber; and
the first air discharge portion and the second air discharge portion are arranged at an interval, to form a negative pressure between the first air discharge portion and the second air discharge portion to provide the suction force to the strip.

8. The strip diverting mechanism according to claim 7, wherein:
an air discharge direction of the first air discharge portion is inclined to a direction away from the second air discharge portion; and
an air discharge direction of the second air discharge portion is inclined to a direction away from the first air discharge portion.

9. The strip diverting mechanism according to claim 7, wherein:
the first air discharge portion and the second air discharge portion are arranged in the gap at an interval in a running direction of the strip.

10. The strip diverting mechanism according to claim 7, wherein:
at least one of an air discharge speed of the first air discharge portion or an air discharge speed of the second air discharge portion is 5-20 m/s.

11. The strip diverting mechanism according to claim 7, wherein:
the negative pressure unit further comprises a first flow guide member and a second flow guide member;
the first flow guide member is connected to a side of the first air discharge portion away from the second air discharge portion, to guide an airflow to flow in the direction away from the second air discharge portion; and
the second flow guide member is connected to a side of the second air discharge portion away from the first air discharge portion, to guide the airflow to flow in the direction away from the first air discharge portion.

12. The strip diverting mechanism according to claim 11, wherein:
at least one of the first flow guide member or the second flow guide member has a length of 20-500 mm.

13. The strip diverting mechanism according to claim 7, wherein:
the negative pressure unit further comprises a first protective member and a second protective member;
one end of the first protective member is connected to a side of the first air discharge portion close to the second air discharge portion, and another end of the first protective member extends toward the second air discharge portion; and
one end of the second protective member is connected to a side of the second air discharge portion close to the first air discharge portion, and another end of the second protective member extends toward the first air discharge portion.

14. The strip diverting mechanism according to claim 7, wherein:
the negative pressure unit further comprises an air equalization member arranged in the chamber and separating an air inlet of the body from the first air discharge portion and the second air discharge portion.

15. The strip diverting mechanism according to claim 1, wherein:
the negative pressure unit includes two air channels located at two sides of the negative pressure unit and configured to discharge air to a direction away from the negative pressure unit, to generate a negative pressure area at a center of the negative pressure unit.

16. A drying device, comprising:
a box; and
the strip diverting mechanism according to claim 1 arranged inside the box and configured to change a running direction of a strip in the box.

17. The drying device according to claim 16,
wherein the strip diverting mechanism is configured to change the running direction of the strip from a first direction to a second direction, the first direction being opposite to the second direction;
the drying device further comprising:
a drying unit arranged in the box and located between a first strip segment running in the first direction and a second strip segment running in the second direction for blowing air to the first strip segment and the second strip segment.

18. The drying device according to claim 17, wherein:
the drying unit is provided with an air chamber, a first air blowing surface, and a second air blowing surface, wherein the first air blowing surface is arranged facing the first strip segment, the second air blowing surface is arranged facing the second strip segment, the air chamber is arranged between the first air blowing surface and the second air blowing surface, and the first air blowing surface and the second air blowing surface are each provided with an air blowing hole in communication with the air chamber.

19. An electrode plate manufacturing apparatus, comprising:
a coating device configured to coat a slurry on a surface of an electrode plate; and
a drying device arranged downstream of the coating device in a running direction of the electrode plate, and configured to dry the slurry on the electrode plate, the drying device comprising:
a box; and
the strip diverting mechanism according to claim 1 arranged inside the box and configured to change a running direction of the electrode plate in the box.

* * * * *